(12) United States Patent
Huang et al.

(10) Patent No.: US 7,362,021 B2
(45) Date of Patent: Apr. 22, 2008

(54) MOISTURE-PROOF DEVICE FOR MOTOR

(75) Inventors: Wen-Shi Huang, Taoyuan Shien (TW); Shun-Chen Chang, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 708 days.

(21) Appl. No.: 10/916,506

(22) Filed: Aug. 12, 2004

(65) Prior Publication Data
US 2005/0012416 A1    Jan. 20, 2005

Related U.S. Application Data

(63) Continuation-in-part of application No. 09/716,745, filed on Nov. 20, 2000, now abandoned.

(30) Foreign Application Priority Data

Dec. 7, 1999    (TW) ............................ 88220836 U

(51) Int. Cl.
*H02K 5/10*    (2006.01)
*H02K 5/12*    (2006.01)

(52) U.S. Cl. ................................ 310/88

(58) Field of Classification Search ............... 310/86, 310/88, 84, 67 R, 68 R, 97, 254
See application file for complete search history.

(56) References Cited

U.S. PATENT DOCUMENTS

| | | | |
|---|---|---|---|
| 4,008,422 A * | 2/1977 | Sodekoda et al. | 318/138 |
| 4,554,473 A * | 11/1985 | Muller | 310/67 R |
| 4,554,491 A * | 11/1985 | Plunkett | 318/254 |
| 4,682,065 A * | 7/1987 | English et al. | 310/90 |
| 4,698,542 A * | 10/1987 | Muller | 310/67 R |
| 4,832,576 A * | 5/1989 | Deguchi et al. | 417/45 |
| 5,616,975 A * | 4/1997 | May et al. | 310/89 |
| 5,786,647 A * | 7/1998 | Vollmer et al. | 310/89 |
| 6,198,189 B1 * | 3/2001 | Takahashi et al. | 310/89 |
| 6,278,207 B1 * | 8/2001 | Matsumoto | 310/88 |
| 6,465,916 B1 * | 10/2002 | Aoshima | 310/49 R |
| 2004/0256933 A1 * | 12/2004 | Toyokawa et al. | 310/89 |

FOREIGN PATENT DOCUMENTS

JP    409037504 A   *   2/1997

OTHER PUBLICATIONS

Official Translation of Patent Reference JP409037504A. Takahashi, Shigeo, Electric Motor, 1997, pp. 1-13.*

* cited by examiner

*Primary Examiner*—Julio C. Gonzalez
(74) *Attorney, Agent, or Firm*—Birch, Stewart, Kolasch & Birch, LLP

(57) ABSTRACT

A moisture-proof device is provided to be used in a fan having a stator for isolating the stator from moisture. The moisture-proof device includes a first covering part for covering a circuit board of the stator of the motor, and a second covering part connected to the first covering part for covering a coil and a core of the stator of the motor, thereby isolating the stator of the motor from moisture, wherein the first covering part and the second covering part are integrally formed as a single piece, wherein the moisture-proof device is disposed in a hub of the fan.

13 Claims, 5 Drawing Sheets

MOISTURE-PROOF DEVICE FOR MOTOR

This application is a Continuation-In-Part of U.S. patent application Ser. No. 09/716,745, filed Nov. 20, 2000, now abandoned.

FIELD OF THE INVENTION

The present invention is a moisture-proof device, and more particularly to one for use with the fan motor.

BACKGROUND OF THE INVENTION

In many kinds of motors, the brushless direct current motor is usually used to achieve the heat-dissipating and air-discharging functions.

Generally, there is a motor for air-discharging in the toilet. The major goal of placing this kind of motor is to remove the odor inside the toilet to keep the freshness of the bathroom. However, due to the fact that this kind of motor is placed in the bathroom or in the toilet, it is easy to get wet all the time. Thus, the moisture-proof design for this kind of motor is an unavoidable issue.

The major goal of the moisture-proof design is to separate the stator part of the motor, which includes the circuit board, the core, and the coil, from its environment to achieve the moisture-proof purpose. Traditionally, the design is to coat a layer of the waterproof gum over the circuit board, the core, and the coil of the stator. However, it is costly.

FIG. 1 is the exploded diagram of the fan according to the prior art. As shown in FIG. 1, the blade 21 of the impeller is mounted on the portion of a rotor, and the stator, which includes the core 23, the printed circuit board 25, and the coil 26, is placed on the base 24. The fan is usually used for air-discharging purpose. Because it is used in the bathroom or the toilet, the lifetime of the coil 26, the circuit board 25, and the core 23 of the stator will decrease due to the moisture influence, Thus, it is necessary to overcome the above-described disadvantage.

FIG. 2 is an improvement over the device of FIG. 1. Basically, the stator is covered with a layer of insulating gum 27 for preventing from moisture. However, besides the coating step, the process has an additional baking step for drying the gum. It is significant that the gum has a certain thickness, so the baking step will spend a lot of time. Therefore, it will decrease the production efficiency.

It is therefore tried by the applicant to deal with the above situation encountered in the prior art.

SUMMARY OF THE INVENTION

It is therefore an object of the present invention to propose a moisture-proof device for the motor to be provided with a good moisture-proof effect, It is therefore another object of the present invention to increase the production capacity of a moisture-proof device for motor through a simplified manufacturing process.

According to the present invention, a moisture-proof device is adapted to be used in a fan having a stator for isolating the stator from moisture. The moisture-proof device includes a first covering part for covering a circuit board of the stator of the motor, and a second covering part connected to the first covering part for covering a coil and a core of the stator of the motor, thereby isolating the stator of the motor from moisture, wherein the first covering part and the second covering part are integrally formed as a single piece, wherein the moisture-proof device is disposed in a hub of the fan.

Certainly, the first covering part is shaped as an annular plate and the second covering part is shaped as a cylinder.

Certainly, the moisture-proof device is connected to a base of fan by an adhesive.

According to another aspect of the present invention, a fan is provided The fan includes a base, a stator disposed on the base, a rotor coupled to the stator and having a hub and a plurality of blades disposed around the hub, and a covering member disposed inside a hub of the rotor and for covering the stator therein, thereby isolating the stator from moisture.

Certainly, the covering member includes a first covering part for covering a printed circuit board of the stator, and a second covering part connected with the first covering part for covering a coil and a core of the stator.

Certainly, the first covering part and the second covering part are integrally formed as a single piece.

Certainly, the first covering part is shaped as an annular plate and the second covering part is shaped as a cylinder.

Certainly, the covering member is connected to the base by an adhesive.

Certainly, the covering member is connected to the base by engagement.

Certainly, the covering member has a dented hole telescoped to a protrusion formed inside the hub of the rotor.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
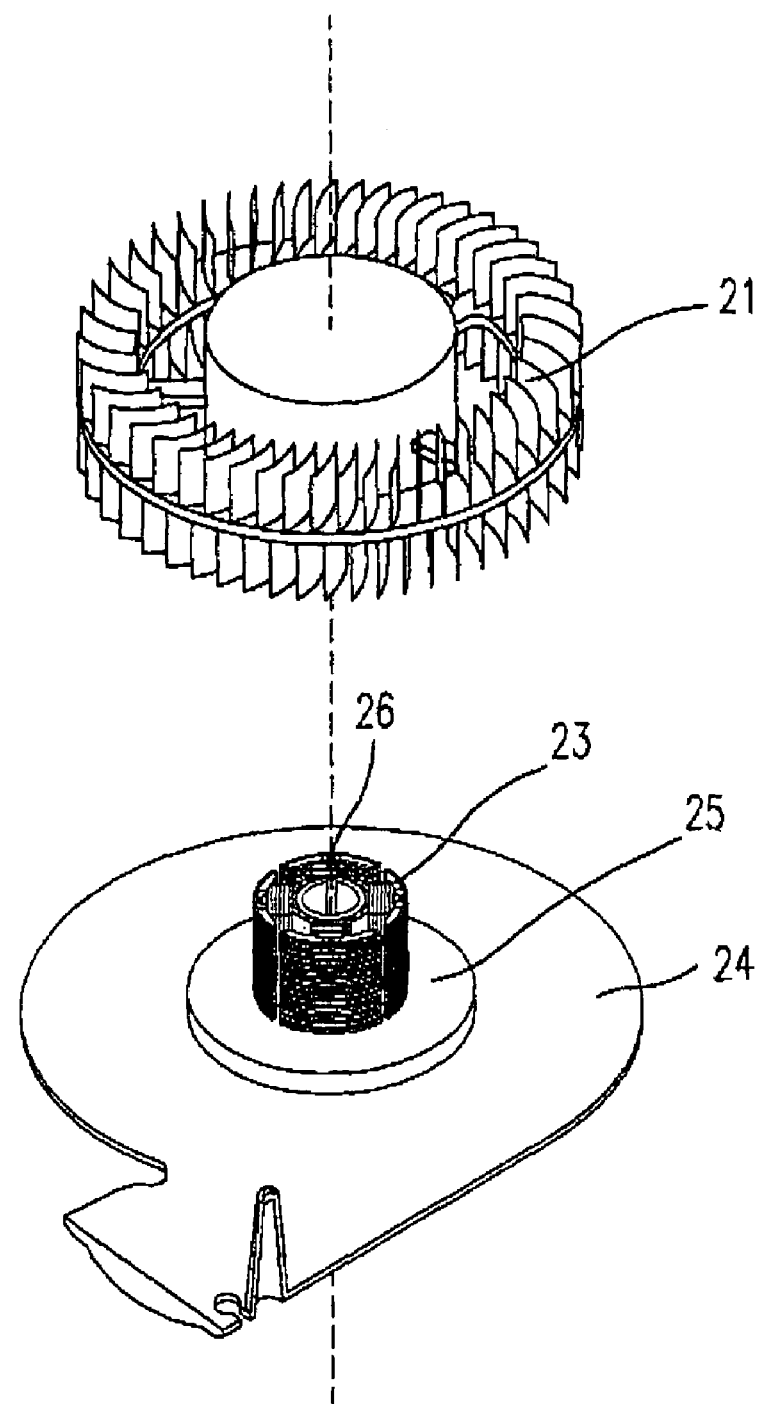
FIG. 1 is the exploded diagram of the conventional fan.
Figure 2:
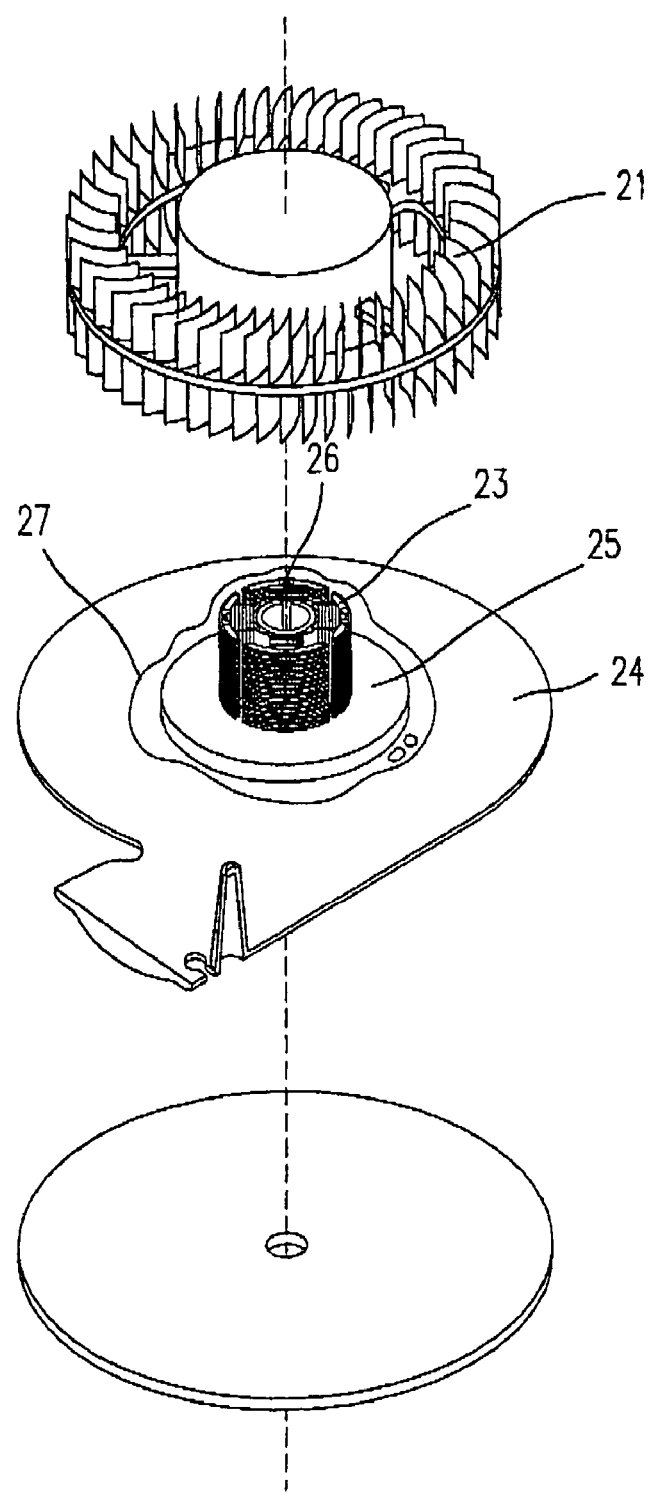
FIG. 2 is the exploded diagram of another conventional fan.
Figure 3:
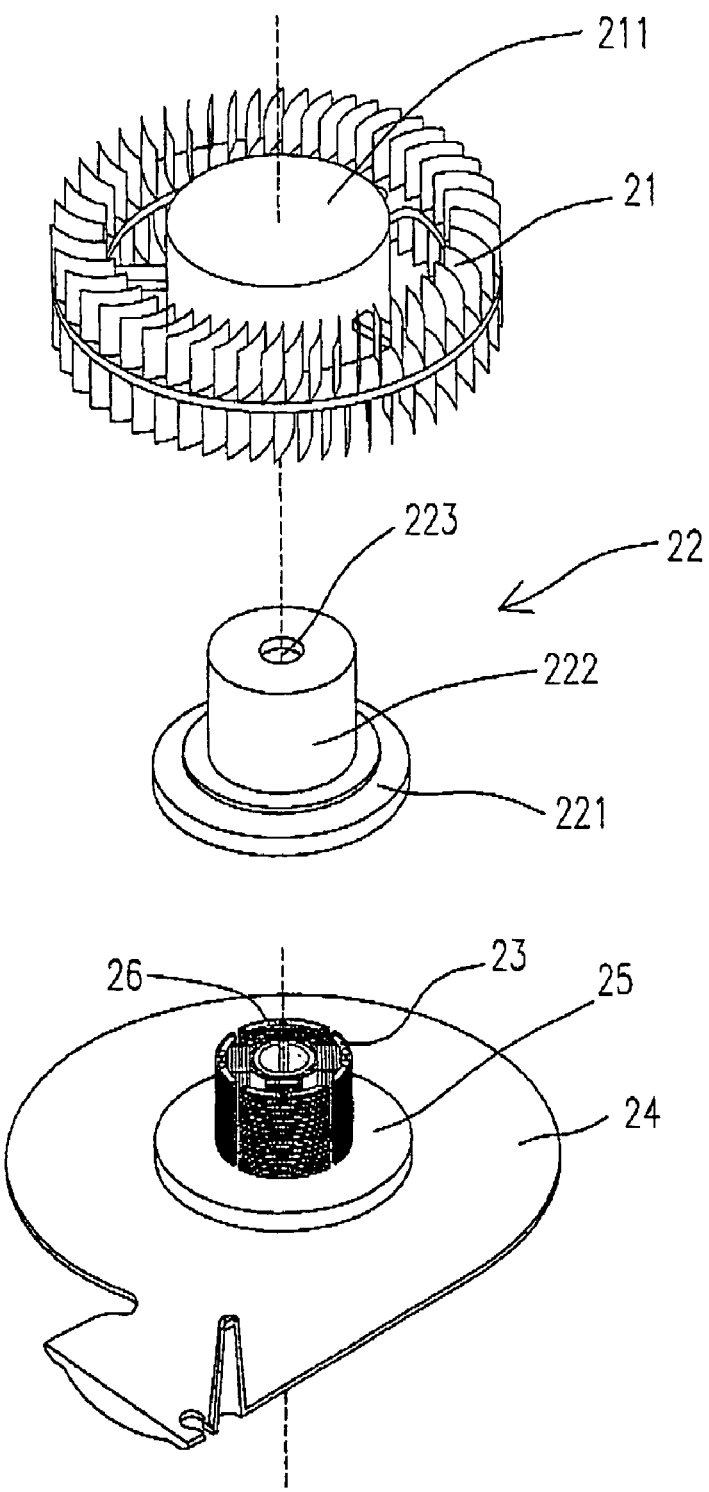
FIG. 3 is an exploded diagram of the fan according to a preferred embodiment of the present invention.

As shown in FIG. 3, the fan has a stator and a rotor and the moisture-proof device 22 of the present invention is assembled with the stator which includes the coil 26, the core 23, and the printed circuit board 25 for isolating the stator of the motor from moisture. The fan has a base 24 used to place thereon the stator of the motor. The moisture-proof device includes a covering member constructed by a first covering part 221 and a second covering part 222. The first covering part 221, which is hollow, is adhered to the base 24 by an adhesive for covering the circuit board 25 of the stator of the motor. In addition, the second covering part 222, which is hollow, is connected to the first covering part 221 for covering the core 23 and the coil 26. The covering member further has a dented hole 223 telescoped to a protrusion 211a formed inside the hub 211 of the rotor 21 and allows the shaft of the fan to pass therethrough and the moisture-proof device 22 is disposed inside the hub 211 of the rotor 21. Therefore, the first covering part 221 is used for covering the printed circuit board 25, and the second covering part 222 is used for covering the core 23 and the coil to achieve the moisture-proof effect.

Figure 4:
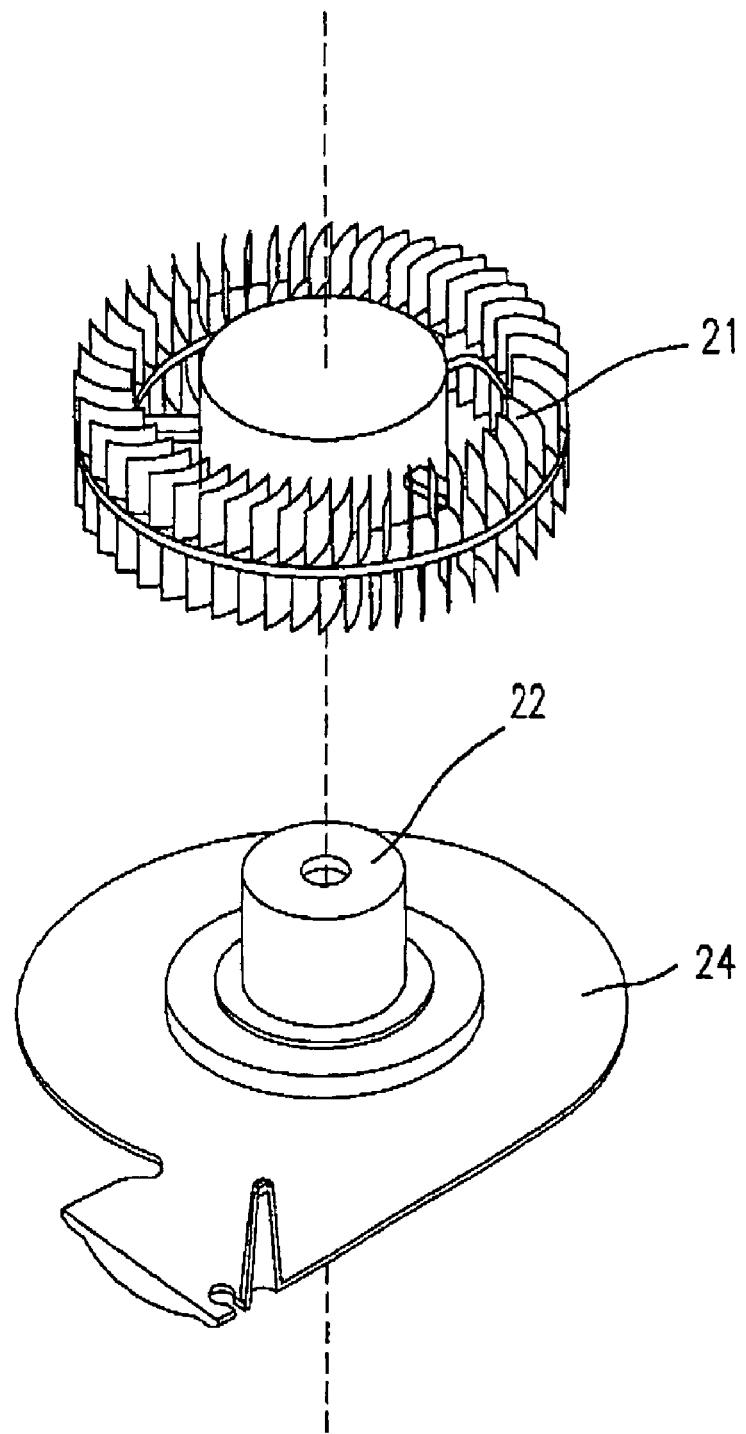
FIG. 4 is a schematic view showing that the moisture-proof device is covered on the printed circuit board and the stator according to the present invention.

As shown in FIG. 4, the moisture-proof device of the present invention is covered on the stator of the motor. The assembly of the moisture-proof device and the stator can be bonded together via an adhesive. Specifically, the first covering part 221 is shaped as an annular plate, and the second covering part 222 is shaped as a cylinder. Due to the required amount of the adhesive for the present invention is much less than that of the prior art, it will save a lot of the baking time of the process. Therefore, the present invention will largely increase the production capacity.

Figure 5:
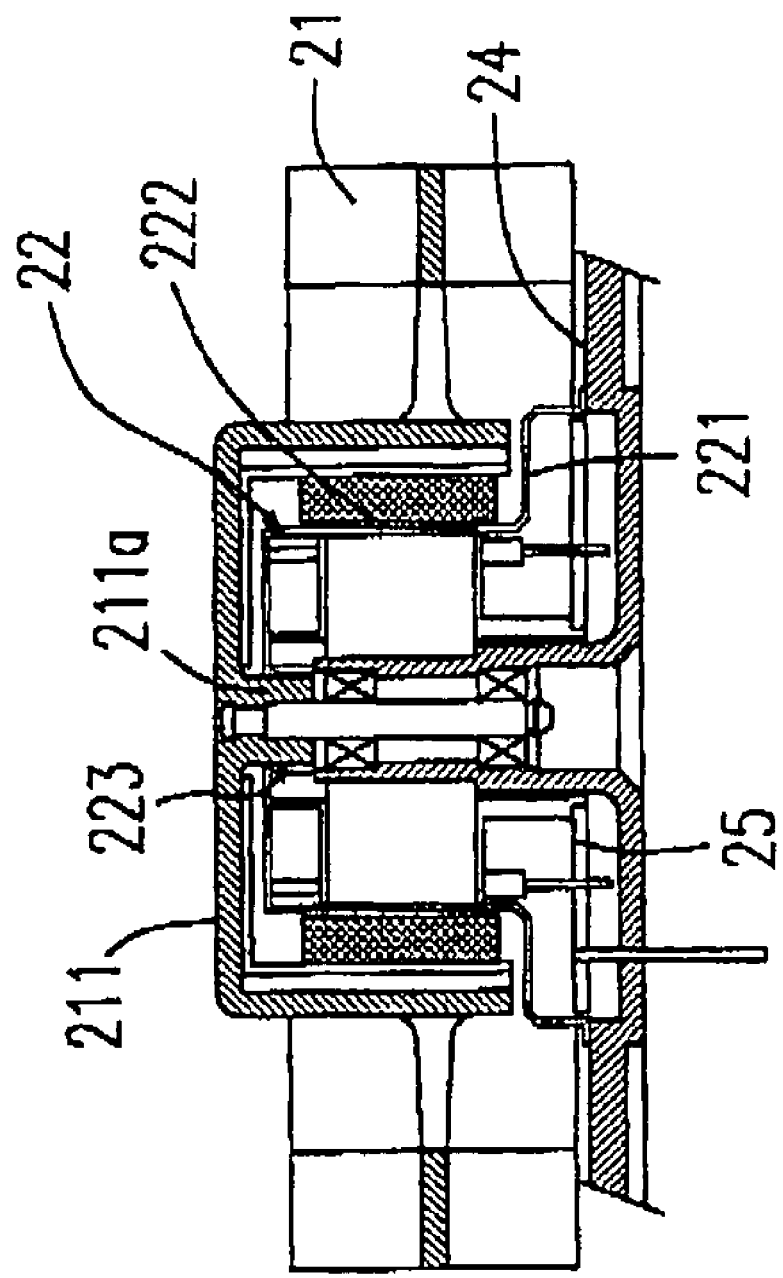
FIG. 5 is a sectional view showing a preferred embodiment of the fan according to the present invention.

As shown in FIG. 5, the first covering part 221 of the moisture-proof device 22 is adhered to the base 24. Preferably, the second covering part 222 can be integrally formed with the first covering part 221 as a single piece. Therefore, the moisture-proof device 22 can completely cover the stator including the core 23, coil 26 and the printed circuit board therein and is positioned inside the hub of the rotor. This present invention not only can provide a good moisture-proof effect but greatly reduce the occupied space of the fan, and the production cost of the moisture-proof device.

Certainly, the covering member including the first covering part 221 and the second covering part 222 can be connected to the base 24 by engagement or other similar ways. In addition, the fan can be a blower, an axial flow fan and so on.

Due to the fact that the moisture-proof device of the present invention is directly used as a mask to cover the stator, it will avoid the long-time baking step of the prior art for drying the adhesive layer. Thus, the present invention can increase the production efficiency.

In sum, the improvement of the structure of the present invention is indeed able to simplify the production operation and increase production efficiency. The present invention is inventive, progressive, and practical.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A moisture-proof device, adapted to be used in a fan having a stator for isolating said stator from moisture comprising:
    a monolithic covering member, comprising:
    a first covering part for covering a circuit board of said stator of said motor; and
    a second covering part connected to said first covering part for covering a coil and a core of said stator of said motor, thereby isolating said stator of said motor from moisture and reducing the occupied space of said fan,
    wherein said moisture-proof device is disposed in a hub of said fan.

2. The device according to claim 1, wherein said first covering part is shaped as an annular plate and said second covering part is shaped as a cylinder.

3. The device according to claim 1, wherein said moisture-proof device is connected to a base of fan by an adhesive or engagement.

4. A fan comprising:
    a base;
    a stator disposed on said base;
    a rotor coupled to said stator and having a hub and a plurality of blades disposed around the hub; and
    a monolithic covering member disposed inside a hub of the rotor, and connected to said base for covering said stator therein, thereby isolating the stator from moisture and reducing the occupied space of said fan;
    wherein the monolithic covering member includes a first covering part shaped as an annular plate for covering a printed circuit board of the stator, and a second covering part shaped as a cylinder connected with said first covering part for covering a coil and a core of said stator.

5. The fan according to claim 4, wherein said first covering part and said second covering part are integrally formed as a single piece.

6. The fan according to claim 4, wherein said covering member is connected to said base by an adhesive.

7. The fan according to claim 4, wherein said covering member is connected to said base by engagement.

8. The fan according to claim 4, wherein the covering member has a dented hole telescoped to a protrusion formed inside the hub of the rotor.

9. The fan according to claim 4, wherein the fan is a blower or an axial flow fan.

10. A fan comprising:
    a base;
    a stator disposed on said base;
    a rotor coupled to said stator and having a hub and a plurality of blades disposed around the hub; and
    a monolithic covering member disposed inside a hub of the rotor, and connected to said base for covering a printed circuit board, a coil and a core of said stator thereby reducing the occupied space of said fan.

11. The fan according to claim 10, wherein said monolithic covering member is connected to said base by engagement.

12. The fan according to claim 10, wherein the monolithic covering member has a dented hole telescoped to a protrusion formed inside the hub of the rotor.

13. The fan according to claim 10, wherein the fan is a blower or an axial flow fan.

* * * * *